United States Patent
Byrd et al.

(10) Patent No.: US 7,956,149 B1
(45) Date of Patent: Jun. 7, 2011

(54) POLYSILICONATED PHOSPHORAMIDE FIRE RETARDANT

(75) Inventors: Norman R. Byrd, Villa Park, CA (US); Douglas G. Soden, San Pedro, CA (US); Arthur Rojo, Cypress, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 12/563,592

(22) Filed: Sep. 21, 2009

(51) Int. Cl.
 *C08G 77/04* (2006.01)
(52) U.S. Cl. .......................... 528/23; 528/399; 442/302
(58) Field of Classification Search ............... 528/25
 See application file for complete search history.

(56) References Cited

U.S. PATENT DOCUMENTS

| | | | |
|---|---|---|---|
| 3,203,923 A * | 8/1965 | Fekete | 528/25 |
| 4,136,037 A | 1/1979 | LeBlanc et al. | |
| 4,403,075 A | 9/1983 | Byrd et al. | |
| 4,582,932 A | 4/1986 | Byrd et al. | |
| 6,388,046 B1 | 5/2002 | Campbell et al. | |

* cited by examiner

*Primary Examiner* — Randy Gulakowski
*Assistant Examiner* — Lindsay Nelson
(74) *Attorney, Agent, or Firm* — Alston & Bird LLP (57) ABSTRACT

Polysiloxane phosphoramide fire retardants are provided having the basic structural unit:

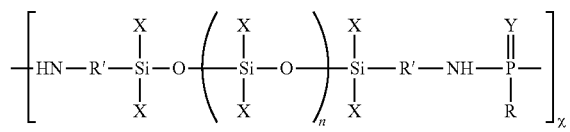

wherein,
 Y is O or S;
 R' is selected from a saturated or unsaturated alkyl, an aryl, a heterocyclic, and a cycloaliphatic;
 R is selected from H, a saturated or unsaturated alkyl, an aryl, a heterocyclic, and a cycloaliphatic;
 X is selected from H, a saturated or unsaturated alkyl, an aryl, a heterocyclic, and a cycloaliphatic;
 n is selected from 0 to 500; and
 χ is selected from 1-500.

23 Claims, 3 Drawing Sheets

POLYSILICONATED PHOSPHORAMIDE FIRE RETARDANT

TECHNICAL FIELD

Embodiments of the present invention are related to polysiliconated phosphoramide fire retardants that can be used as a stand alone entity, a coating material, or as a reactive additive in an adhesive or resin matrix.

BACKGROUND

Graphite design, fabrication, test and analytical studies have shown that the use of high-stiffness, high-strength composites such as graphite/resin composites can reduce the weight of structural components by as much as 50%, improve structure efficiency, and provide significant benefits in cost and performance.

Accordingly, considerable interest has arisen in the use of graphite composites in both internal and external aircraft applications as well as in engine nacelles. For instance, in external applications such as in fairings, skins, rudders, stabilizers, flaps and doors, as well as in engine nacelles, it would be desirable for the resin to resist burning and also prevent short lengths of the graphite fiber from spreading to other areas. For internal applications such as cargo compartment liners and passenger compartment floor panels, it would be desirable to utilize a resin that eliminates or mitigates the level of flammability, smoke, and toxicity.

Further, in the nacelle, fire spreading from the hot zone through an acoustic panel fire wall could affect fuel lines, electrical equipment and hydraulic fluids, among other items. For this reason, the FAA has established a fire-safe requirement that any fire wall in an aircraft should be capable of withstanding a 2000° F. flame for 15 minutes.

Any organic material will burn if its ignition temperature is reached. However, extensive research has been conducted for a number of years to reduce the hazards from fire. In most cases, fire-retardant additives have been chosen. In other instances, polymer structures have been modified in order to reduce burning tendencies. Thus, the flammability of polymeric systems can be controlled by introducing elements which interfere with gas-phase oxidation reactions in the flame zone or modify the pyrolysis and decomposition reaction in the solid phase. Both bromine and chlorine are used extensively in the formulation of flame-retardant chemicals for polymers and operate by interfering with vapor phase combustion reactions. Organophosphorous compounds interfere with the combustion reaction in the condensed phase.

There are two general approaches to imparting flame retardance to materials, reactive and additive. Reactive fire-retardant chemicals enter into chemical reaction and become an integral part of the polymer structure; whereas the additive chemical is physically dispersed in the polymer but does not become part of the polymer structure. Generally, those compounds containing a halogen (usually chlorine or bromine), phosphorous, or nitrogen have been found to be effective flame retardants. Reactive flame-retardant intermediates are normally used in the manufacture of unsaturated polyesters, alkyds, epoxies and polyurethanes. However, the term "flame retardant" becomes moot. For instance, materials that are flame retardants at relatively low heat flux (e.g., a burning match) can have little or no effect in the high heat flux that accompanies a fuel spill or some other fire generating a 2000° F. flame.

Although a large class of brominated fire retardants has been used quite extensively, the toxic byproducts generated have resulted in their use being phased out. Hence, as a replacement of the brominated compounds, the phosphorylated compounds have been used increasingly. One class of phosphorylated compounds has been polyphosphinohydrazides generalized by the structure represented by Formula 1:

where R is H, alkyl, aryl, heterocyclic, or cycloaliphatic.

Although polyphosphinohydrazides according to Formula 1 have performed well and have been able to replace the brominated fire retardants, they have not done well above 2000° F. and are also greatly hydrophilic in nature. As such, polyphosphinohydrazides are easily washed out of composites and laminates using such materials upon contact with water. Accordingly there remains a need for a fire retardant that exhibits a similar or superior fire retarding capability while at the same time being resistant to dissolution by water. There also remains a need for a fire retardant that does not generate toxic products or leach out of the resin systems. Furthermore, there remains a need for a fire retardant that exhibits a fire retarding capability at or above 2000° F. that leaves a structurally stable char.

BRIEF SUMMARY

Embodiments of the present invention satisfy at least some of the aforementioned needs by providing a polysiliconated phosphoramide fire retardant that exhibits a thermal stability as well as or superior than that of brominated fire retardants. Additionally, the polysiliconated phosphoramide fire retardants according to embodiments of the present invention can be used as a stand alone entity, a coating material, or as a reactive additive in an adhesive or resin matrix. With regard to embodiments of the present invention capable of being used as a reactive additive, such fire retardants are capable of being chemically bound to a large variety of resins, adhesives, or coatings. Beneficially, polysiliconated phosphoramide fire retardants according to embodiments of the present invention are resistant to water and do not dissolve upon contact with water. Embodiments of the present invention also form a non-volatile stable char with structural integrity.

Embodiments of the present invention include a polysiloxane phosphoramide according to Formula 2 having the basic structural unit:

where Y is O or S; R' can be selected from a saturated or unsaturated alkyl, an aryl, a heterocyclic, and a cycloaliphatic; R can be selected from H, a saturated or unsaturated alkyl, an aryl, a heterocyclic, and a cycloaliphatic; X can be selected from H, a saturated or unsaturated alkyl, an aryl, a heterocyclic, and a cycloaliphatic; n can be selected from 0 to 500; and χ can be selected from 1-500.

In one aspect, at least some of the aforementioned needs are achieved, according to embodiments of the present invention, by providing a resin comprising a polysiloxane phosphoramide alone or in a mixture with a desirable base polymer such as a polyimide or epoxy-based resin. Such resins can then by applied to virtually any substrate that will form a chemical bond with the resin, such substrates can include but are not limited to a glass cloth to form a "prepreg". The resin is cured to obtain a fire resistant composite or laminate. In certain embodiments, the resin can be applied as a coating to form a fire resistant layer covering a substrate reactive with any functional group in the resin. That is, some embodiments of the present invention comprise a fire resistant coating containing polysiloxane phosphoramide according to Formula 2 and a method of treating a surface to render the surface fire resistant.

Certain embodiments of the present invention provide a resin comprising a polysiloxane phosphoramide having the basic structural unit:

(2)

where Y is O or S; R' can be selected from a saturated or unsaturated alkyl, an aryl, a heterocyclic, and a cycloaliphatic; R can be selected from H, a saturated or unsaturated alkyl, an aryl, a heterocyclic, and a cycloaliphatic; X can be selected from H, a saturated or unsaturated alkyl, an aryl, a heterocyclic, and a cycloaliphatic; n can be selected from 0 to 500; and χ can be selected from 1-500. In certain embodiments, the resin comprises a mixture of at least one of the aforementioned polysiloxane phosphoramides according to Formula 2 and a base polymer comprising a polyimide, an epoxy-based resin, a polybenzimidazole, a polyester, polyquinoxyline, polyacrylate, phenolic polymer, or a silicone. Any of these polymer resins can be cured to form fire resistant composites for use in a wide variety of structural or non-structural components having a polysiloxane phosphoramide chemically adhered to or incorporated therein.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which some, but not all embodiments of the inventions are shown. Indeed, the invention may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

Embodiments of the present invention comprise polysiliconated phosphoramide fire retardants that form a structurally stable char and can be used as a stand alone entity, a coating material, or as a reactive additive in an adhesive or resin matrix. Beneficially, polysiliconated phosphoramides according to embodiments of the present invention are resistant to water and do not wash off of treated surfaces or out of impregnated fabrics. Polysiliconated phosphoramides according to embodiments of the present invention are capable of being chemically bound to almost any resin or surface and beneficially will not leach out over time. That is, embodiments of the present invention can also be utilized as a reactive addition in a composite resin, wherein the polysiliconated phosphoramides chemically bond with the base polymer or material to be rendered fire resistant. Traditionally used materials (e.g., brominated fire retardants), do not form a bond to the matrix resin or adhesive or coating chemical. As such, they may also generate toxic products. Additionally, commonly used fire retardants such as intumescent agents are simply dispersed particulates that do not leave structurally stable chars. As such, intumescent agents need to be incorporated into a carrier and are not capable of being structural entities.

Certain embodiments are also capable of being provided in the form of a stand-alone structural part (e.g., a silicone rubber or silicone adhesive that is fire resistant). Furthermore, polysiliconated phosphoramides according to embodiments of the present invention can also be incorporated into a paint, resin or applied as a protective coating onto any substrate and make that substrate fire resistant. This, in part, enhances its ability to be a uniformly available fire retardant and capable of forming a non-volatile stable char with structural integrity.

Additionally, embodiments of the present invention provide a greater usefulness and versatility than at least a number of previously available fire retardants due at least in part to the capability of being applied as a neat material to any substrate to enhance its fire resistant capability. In certain embodiments, the polysiliconated phosphoramide fire retardants are provided in the form of a trowellable (sprayable) polymer that can be used for all general surfaces; such as seats, walls, wood surfaces, etc. For example, such embodiments can either be incorporated into a resin or adhesive to form a homogeneous solution with the fire retardant chemically bound to the material being protected or used as a protective film over any surface.

Polysiloxane phosphoramides according to embodiments of the present invention have a basic structural unit according to Formula (2):

(2)

where Y is O or S; R' can be selected from a saturated or unsaturated alkyl, an aryl, a heterocyclic, and a cycloaliphatic; R can be selected from H, a saturated or unsaturated alkyl, an aryl, a heterocyclic, and a cycloaliphatic; X can be selected from H, a saturated or unsaturated alkyl, an aryl, a heterocyclic, and a cycloaliphatic; n can be selected from 0 to 500; and $\chi$ can be selected from 1-500. In one embodiment, R is an alkyl or vinyl and n has a value of 1, 2, 3, 4, or 5.

In certain embodiments, the polysiloxane phosphoramides can include a variety of independently selected moieties. In such embodiments, Y is O or S; R and R' can each independently be H, alkyl, with straight chain or branched chain, and generally containing from about 1 to about 6 carbon atoms, e.g., methyl, ethyl, propyl, isopropyl, butyl, isobutyl, pentyl, hexyl, and isohexyl; cycloalkyl, generally containing from about 5 to about 7 carbon atoms, such as, for example, cyclopentyl, cyclohexyl, methylcyclohexyl; aryl, generally containing from about 6 to about 14 carbon atoms, such as phenyl, xylyl, tolyl, naphthyl, methylnaphthyl and ethylnaphthyl; the corresponding halogenated alkyl and aryl groups including, for example, the chlorinated, brominated and fluorinated derivatives, e.g. trichloromethyl and chlorophenyl, nitroaryl containing about 6 to about 14 carbon atoms such as nitrophenyl, nitrotolyl, and the like; heterocyclic containing 5 to 6 members in the heterocyclic nucleus, and O, N or S as hetero atoms, e.g., furanyl, pyridyl, pyrrolyl, quinolyl and thiophene; amino, alkylamino containing from about 1 to about 8 carbon atoms in the alkyl group, e.g., methylamino, ethylamino, dimethylamino, diethylamino, arylamino containing from about 6 to about 14 carbon atoms such as phenylamino and naphthylamino, oxyalkyl containing from 1 to about 4 carbon atoms such as oxymethyl, oxyethyl, oxypropyl, and oxyaryl containing about 6 to about 14 carbon atoms such as oxyphenyl, oxytolyl and oxynaphthyl, and the like.

The polysiliconated phosphoramides according to Formula (2) react with the oxygen radical formed in a flame and becomes a radical trap-tying up the oxygen and preventing it from further oxidizing (burning) the substrate in which it was embedded. Furthermore, the nitrogen from the amide (or from an amide or hydrazide incorporated into a side chain of the polysiliconated phosphoramide) can came off and act as a blanketing substance over a substrate to minimize further attack from oxygen radicals.

The phosphorous moiety can react with the carbonaceous residue that forms and forms phosphorous carbide, which is a stable char. Additionally, the siliconated moiety forms silicon carbide, as opposed to the oxidative degradation of the organic compounds of the substrate. Thus, a structurally stable char can be obtained as opposed to the oxidation of the organic substrate to $CO_2$ and $H_2O$ and leaving nothing behind. In effect, then, the stable char can also act as a structurally intact firewall; whereas total oxidation (by burning) allows the flames to penetrate to other regions.

In certain embodiments, polysiloxane phosphoramides according Formula (2) can be modified by adding specific functional groups, such as on side chains, that enables the polymer to react with itself and/or with other materials (e.g., materials to be rendered fire resistant). In certain embodiments, that is, the functional groups on the phosphorous and/or silicon atoms are reactive in nature (e.g., vinyl, allyl, carboxyl, and the like) such that they will co-react with active sites on a substrate (e.g., polyamide, wool, cellulose, rubber, etc.). For instance, X, R, R' or a combination thereof can be modified to include desirable functional groups to promote reactions between the polymer and a particular material to be protected (e.g., rendered fire resistant). By way of example only, X, R, R' or any combination thereof can be modified such that R' can be an alkyl; aryl; heterocyclic; olefinic; polyolefinic; acetylenic; alpha-amino carboxylic; polyimide; polyamide; polyaryl; or combinations thereof while R and X can be vinyl; allyl; acetylenic; acrylic; polyolefinic; carboxyl; mercaptyl; disulfides; trialkylsilane; hydrogen; metallocene (e.g., ferrocene or zirconocene) so that bonding between the polysiloxane phosphoramides and a substrate such as a cotton cloth is facilitated.

In one aspect, the present invention provides embodiments comprising a resin including a polysiloxane phosphoramide according to Formula (2) alone or in a mixture with a desirable base polymer such as a polyimide or epoxy-based resin. Such resins can then be applied to virtually any substrate that will form a chemical bond with the resin, such substrates can include but are not limited to a glass cloth to form a "prepreg". The resin is cured to obtain a fire resistant composite or laminate. In certain embodiments, the resin can be applied as a coating to form a fire resistant layer covering a substrate reactive with any functional group in the resin. That is, some embodiments of the present invention comprise a fire resistant coating containing polysiloxane phosphoramide according to Formula 2 and a method of treating a surface to render the surface fire resistant.

In certain embodiments of the present invention, the resin includes a mixture of a polysiloxane phosphoramide according to Formula (2) and a base polymer selected from a polyimide or epoxy resin. Such polyimides can be either a condensation type polyimide or an addition type polyimide. According to certain embodiments, the polyimides are preferably selected from Monsanto 703, Peti 5, Peti 228, Peti 330 and PMR-15. Epoxy resins which can be employed include an epoxy resin produced by condensation of bisphenol A and epichlorohydrin. Other epoxies could be glycidylesters, glycidylamines.

In alternative embodiments, the base polymer can include polybenzimidazoles, polyesters, polyquinoxylines, polyacrylates, phenolic polymers and silicones. Polybenzimidazoles can be the reaction product of 2,2'-diamino benzidine with the phenyl ester of p,p'-diphenyl ether benzoic acid; Polyquinoxylines can be the reaction product of 2,2'-diamino benzidine with a bisbenzene glyoxal. Examples of phenolic polymers which can be employed include phenol-formaldehyde resins. Exemplary silicones include dimethyl polysiloxanes and methyl phenyl polysiloxanes. Examples of polyacrylates include polymethyl acrylate and polymethyl methacrylate. As referenced earlier, the polysiloxane phosphoramide according to Formula (2) are capable of chemically bonding to the above resins and become an integral part of the cured resin composition, and not merely an admixture of the additive and the resin. Thus, the polysiloxane phosphoramide cannot be leached out of the cured composition. In certain embodiments according to the present invention, the weight percent of the polysiloxane phosphoramide in the base polymer can range from 1% to 45%, 1% to 30%, or from 5% to 20%.

Substrates to which the resin compositions of the invention can be applied, include (but not limited to) graphite fibers or fabric, glass fibers or fabric, particularly high silica glass fabric such as the material marketed as "Refrasil", low melting point metals (e.g., aluminum), wool, linen, cellulose, rubber (e.g., natural, polybutadiene, neoprene, and the like), polyimide, polyamides (e.g., nylon, Kelar), epoxies, polyesters, silicones, wood and the like. Further, resin compositions including polysiloxane phosphoramide according to Formula (2), the polymeric phosphorylated amide additives, e.g. polyimide containing a polysiloxane phosphoramide according to Formula (2), and substrate, can be formed into several plies to produce a composite or laminate, and cured. In addition to use in aircrafts, the composites of the invention can also be used as fire walls in houses, in ships, in autos (between the passenger compartment and either the engine or the gas tank), in trains, etc.

In one embodiment, the polymer resin comprises a polysiloxane phosphoramide having the basic structural unit:

(2)

where Y is O or S; R' can be selected from a saturated or unsaturated alkyl, an aryl, a heterocyclic, and a cycloaliphatic; R can be selected from H, a saturated or unsaturated alkyl, an aryl, a heterocyclic, and a cycloaliphatic; X can be selected from H, a saturated or unsaturated alkyl, an aryl, a heterocyclic, and a cycloaliphatic; n can be selected from 0 to 500; and $\chi$ can be selected from 1-500. In certain embodiments according to the present invention, the resin comprises a mixture of a polysiloxane phosphoramide according to Formula (2) and a desirable base polymer. Preferably, the base polymer is a polyimide or an epoxy-based resin. However, the resin can include other base polymers such as a polybenzimidazole, a polyester, polyquinoxyline, polyacrylate, phenolic polymer, or a silicone.

In certain embodiments according to the present invention, the resin is provided in the form of a neat sprayable solution. For instance, in certain embodiments according of the present invention the resin includes a polysiloxane phosphoramide according to Formula (2) alone (e.g., in the absence of a base polymer) and n and $\chi$ can independently be selected such that the viscosity is low enough that the polysiloxane phosphoramide resin is sprayable as a neat material. In one embodiment, n can be either 1 or 2 and the resulting viscosity is low. In another embodiment, n can be 0, 1, or 2 and $\chi$ can be 1 or 2. In these embodiments, the resulting viscosity is similar to that of lightweight cooking oil (e.g., olive oil) and is therefore easily sprayable. In such embodiments, the percent solids of the polysiloxane phosphoramide can range from 20%-100%, 20%-90%, 50%-90%, or from 80%-90%.

In yet another embodiment according to the present invention, the resin includes a polysiloxane phosphoramide according to Formula (2) alone (e.g., in the absence of a base polymer) and n has a value of 1, 2, 3, 4, or 5, preferably n has a value of 3, 4, or 5. In such embodiments, the polysiliconated phosphoramide resin can be in the form of a solution or colloidal slurry in either water, alcohol, methylethylketone, toluene, tetrahydrofuran, dimethylacetamide or mixtures thereof. In such embodiments, the percent solids of the polysiloxane phosphoramide can range from 20%-100%, 20%-90%, 50%-90%, or from 80%-90%.

In other embodiments according to the present invention, n and/or $\chi$ can have a value above 5. In such embodiments, the polysiloxane phosphoramide resin becomes extremely viscous or solid. Such polysiloxane phosphoramide resins can be dissolved in a solvent and made into a colloidal emulsion in water or as a paint to be applied to a substrate. In certain embodiments, n can have a value selected from 200-500, 250-450, or 300-400. In these particular embodiments, the polymer comprises a rubbery solid and can be used as a structural material or dissolved in a solution for depositing on a substrate.

In additional embodiments according to the present invention, the resin is provided in the form of a neat sprayable solution and includes a polysiloxane phosphoramide according to Formula (2) and one or more of the previously mentioned polymers (e.g., polyimide or linear epoxy that is not crosslinked). In such embodiments, the resin should be dissolved in a solvent (e.g., tetrahydrofuran or methylethyl ketone) to form a sprayable solution or emulsion. Preferably, the solvent employed is a volatile solvent in order to leave a sold residue on the substrate being treated or coated.

In another aspect, embodiments of the present invention provide highly fire resistant composites or laminates particularly applicable as structural components in aircraft, e.g. in the engine nacelle, as part of the acoustic panel-fire wall structure, and capable of withstanding a flame temperature up to and including 2,000° F. The fire resistant composites and laminates include a polysiloxane phosphoramide according to Formula (2) chemically bonded or incorporated within a base resin (e.g., a polyimide or an epoxy resin). The resulting resin (i.e., mixture of the polysiloxane phosphoramide according to Formula (2) and the base polymer) can then be applied to or impregnated into a substrate such as glass fiber cloth, graphite fiber or any of the previously mentioned substrates, to form a composite structure which is then cured. The resulting cured composite when subjected to high temperatures of the order of about 2,000° F. form a resin char of reduced thermal conductivity which holds the fibers of the laminate together and maintains the structural stability and integrity of the composite or laminate.

In one embodiment, the present invention provides a fire resistant composite comprising a cured polymer resin comprising a polysiloxane phosphoramide according to Formula (2). In other embodiments according to the present invention, fire resistant composites comprise a cured polymer resin, wherein the resin is a mixture of a polysiloxane phosphoramide according to Formula (2) and a base polymer such as a polyimide, an epoxy-based resin, a polybenzimidazole, a polyester, polyquinoxyline, polyacrylate, polyamide, phenolic polymer, or a silicone.

In another aspect, the invention provides a method of treating a surface to render the surface fire resistant by applying to the surface a liquid composition comprising at least one polysiloxane phosphoramide according to Formula (2). In certain embodiments, the liquid composition is a sprayable solution or colloidal slurry having a percent solids of the polysiloxane phosphoramide ranging from between about 20%-100%, 20%-90%, 50%-90%, or from 80%-90%. Depending on the selected value of n and/or $\chi$, the liquid composition can be either a liquid or a colloidal slurry in either water, alcohol, or a suitable solvent. Preferably, the surfaces for protection are rendered fire resistant by spraying the polysiloxane phosphoramide composition onto the surface. However, the polysiloxane phosphoramide compositions can be applied to a substrate in any manner, such as being brushed on or rolled on to the substrate.

Embodiments of the present invention also provide a fire resistant article comprising an inorganic or organic surface having a fire resistant layer bonded to the surface. The fire resistant layer or coating includes a polysiloxane phosphoramide according to Formula (2). The fire resistant layer or coating, which were rendered fire resistant upon being coated with a composition including a polysiloxane phosphoramide according to Formula (2), can be attached to the surface of any article by chemical bonds formed between the surface and any reactively compatible functional group incorporated into the polysiloxane phosphoramide. For instance, in certain embodiments the polysiloxane phosphoramides according Formula (2) can be modified by adding specific functional groups, such as on side chains, that enables the polymer to react with itself and/or with other materials (e.g., materials to be rendered fire resistant). That is, the functional groups on the phosphorous and/or silicon atoms are reactive in nature (e.g., vinyl, allyl, carboxyl, and the like) such that they will co-react with active sites on a substrate (e.g., polyamide, wool, cellulose, rubber, etc.). For instance, X, R, R' or a combination thereof can be modified to include desirable functional groups to promote reactions between the polymer and a particular material to be protected (e.g., rendered fire resistant). By way of example only, X, R, R' or any combination thereof can be modified such that R' can be an alkyl; aryl; heterocyclic; olefinic; polyolefinic; acetylenic; alpha-amino carboxylic; polyimide; polyamide; polyaryl; or combinations thereof while R and X can be vinyl; allyl; acetylenic; acrylic; polyolefinic; carboxyl; mercaptyl; disulfides; trialkylsilane; hydrogen; metallocene (e.g., ferrocene or zirconocene) so that bonding between the polysiloxane phosphoramides and a substrate such as a cotton cloth is facilitated. Fire resistant articles can include surfaces (including but not limited to) comprising graphite fibers or fabric, glass fibers or fabric, particularly high silica glass fabric such as the material marketed as "Refrasil", low melting point metals (e.g., aluminum), wool, linen, cellulose, rubber (e.g., natural, polybutadiene, neoprene, and the like), polyimide, polyamides (e.g., nylon, Kelar), epoxies, polyesters, silicones, and wood.

In yet another aspect, the present invention provides a method for preparing a polysiloxane phosphoramide fire retardant comprising a step of reacting a P-substituted phosphonate ester with a diamino-substituted silane. This reaction can be performed in either a neat reaction or in a solvent (e.g., xylene or dimethylacetamide (DMAC)) with a basic catalyst (e.g., pyridine) at an elevated temperature (e.g., 100° C. to 140° C. or 120° C. to 140° C.) from about 2 hours to about 6 hours (preferably about 4 hours) to effect an aminolysis of the phosphate ester by distilling off the alcohol.

In such embodiments, the silane may be monomeric, dimeric or polymeric of the following general Formula (3):

where Z=O, S, alkyl (saturated or unsaturated), aryl, heterocyclic, cycloaliphatic (saturated or unsaturated), metallocene (e.g., ferrocene, zirconocene, etc.), a can be 1 to 500, and where R' and X are as previously defined. The P-substituted methyl phosphonate used can be of the following general Formula (4):

where R is as previously defined.

Figure 1:
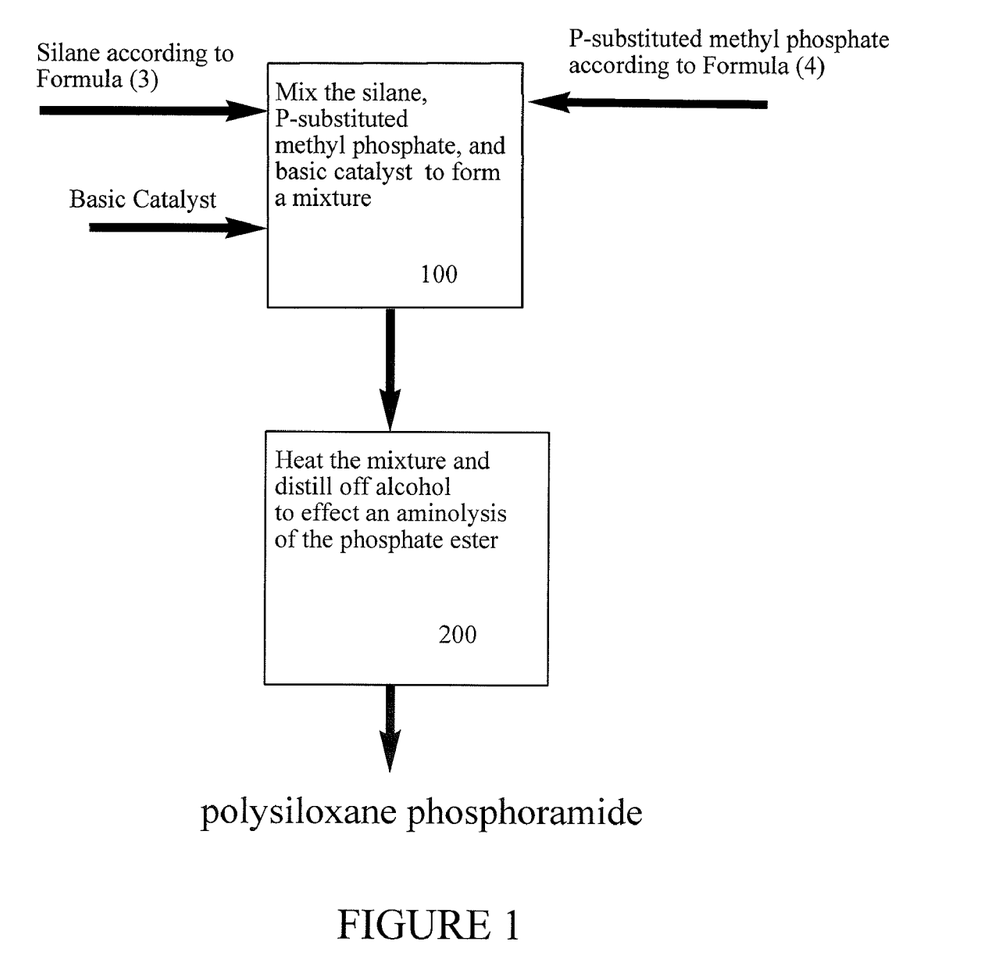
FIG. 1 is a flow chart illustrating a method for preparing a polysiloxane phosphoramide according to embodiment of the present invention.

In one embodiment according to the present invention illustrated in FIG. 1, a silane according to Formula (3), a P-substituted methyl phosphonate according to Formula (4), and a basic catalyst are mixed 100 to provide a reaction mixture. The resulting reaction mixture from step 100 is then heated to in a reaction step 200 to a temperature between about 120° C. to 140° C. while distilling off the alcohol to provide a polysiloxane phosphoramide.

EXAMPLES

I. Polymer Synthesis

The first polymer synthesized was poly (dimethylsiloxane methylphosphoramide). More specifically, 49.9 g (0.04 m) of dimethyl methylphosphonate (DMMP) and 100.0 g (0.04 m) of aminopropyl dimethylsilane dimer were charged to a 500 mL round bottom flask equipped with a stirrer and a Dean-Stark trap. To this was added 150 mL of dimethyl acetamide (DMAC) and 2 mL of pyridine (catalyst). The flask was purged for one hour with dry argon. The reaction was heated slowly to 120° C. for 4 hours during which 25-30 mL of distillate was collected. The solution was cooled to room temperature and stored in a glass bottle. The product was a clear, bright yellow solution, and is designated hereinafter as Product I (R=$CH_3$; X=$CH_3$ from Formula 2).

The next polymer synthesized was poly (dimethylsiloxane phosphitylamide). In this case, 44.3 g (0.04 m) of dimethyl phosphite (DMPH) and 100.0 g (0.04 m) of aminopropyl dimethylsilane dimer were charged to a 500 mL round bottom flask equipped with a stirrer and a Dean-Stark trap. To this was added 150 mL of dimethyl acetamide (DMAC). Catalization was from the acidic proton on the dimethyl phosphite. The flask was purged for one hour with dry argon. The reaction was heated slowly to 140° C. for 4 hours during which 25-30 mL of distillate was collected. The solution was cooled to room temperature and stored in a glass bottle. Product was a clear, colorless solution with a white, slushy precipitate. After removal of the DMAC and washing with acetone, a white crystalline solid was obtained. The solids were readily soluble in water. The water solubility is attributed to the proton attached to the phosphorous atom which allows this product to be solvated by water. Hereinafter, this resulting product is referred to as Product II (R=H; X=$CH_3$ from Formula 2).

Figure 2:
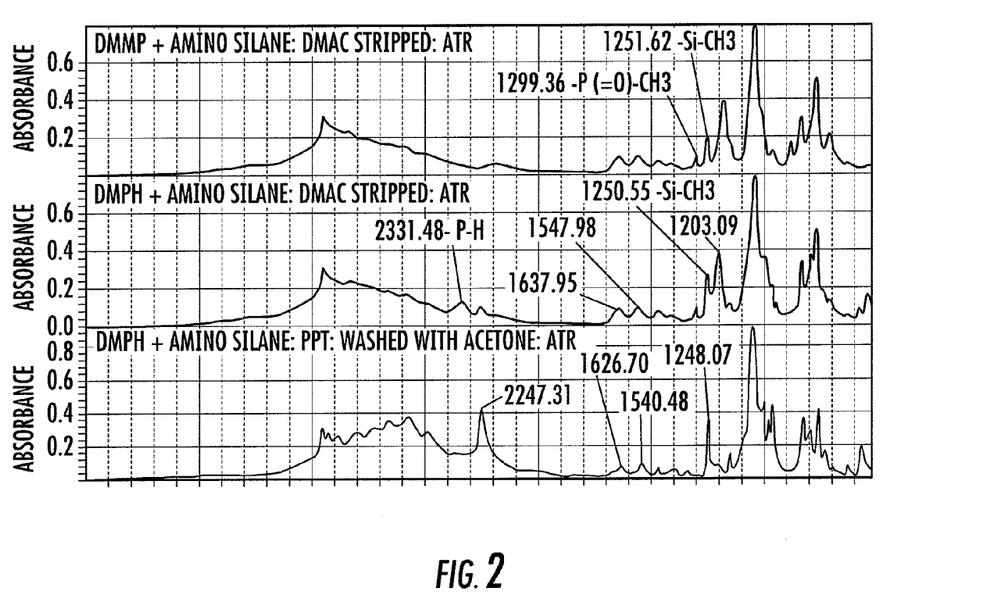
FIG. 2 shows the Fourier Transform Infared (FTIR) spectra for two polysiliconated phosphoramides according to embodiments of the present invention.

FIG. 2 shows the FTIR spectra of Product I (DMMP+aminosilane) and Product II (DMPH+aminosilane) in both stripped form and crystalline form.

Products I and II can be provided in forms ranging from a neat, viscous sprayable solution to a tough, stand-alone entity.

II. Flame Testing

For purposes of evaluating the polymers of Products I and II, a brominated compound (tetrabromo bisphenol A) was used and is designated as Product III. The control (i.e, no treatment) is designated as Product IV.

Product I was used as-is. That is, the solution was applied directly to the cotton cloth using the minimum necessary to wet the cloth. The treated cloth was dried for 2 hours at 180° F. Product II was dissolved to ~30% solids in water and applied as above. The cloth was dried 2 hours at 180° F. Tetrabromobisphenol A (i.e., Product III) was applied to the cloth by the same method, as above. Control (i.e., Product IV) was an untreated cloth.

A ring stand equipped with a 4" diameter ring was used to support the sample clothes. That is, each sample cloth was separately placed on a ring. A flame was applied with a small Bunsen burner with a flame height of 1". The flame was applied to the underside of the supported cloth so that the tip of the flame just touched the cloth. The flame was held in place until ignition occurred (e.g., 3-4 seconds). The flame was removed and the sample was allowed to burn until it self extinguished. The remains, if any, were collected and photographed for each sample.

For the control sample (untreated cloth), the start of flaming occurred in about 3-4 seconds. The samples treated with Products I and II had a delayed ignition time of up to about 10 seconds. The brominated sample (i.e., Product III) started flaming around 4 seconds.

Figure 3:
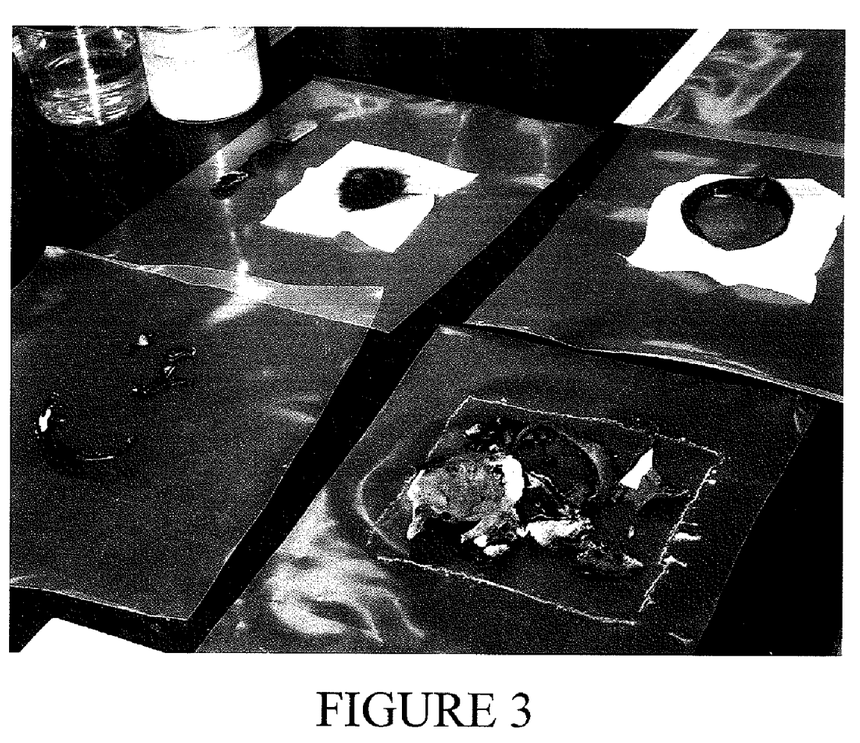
FIG. 3 shows the remains of clothes after burn tests.

FIG. 3 shows the collective results of the remains of all the samples after the burn tests. Looking at the FIG. 3, and reading clockwise from lower left the remains of each cloth are as follows: the untreated (control -IV) cloth 1; remains from the cloth treated with Product I 2 (i.e., polysiliconated phosphoramide (R=CH$_3$)); the remains from the cloth treated with Product III 3 (i.e., brominated fire retardant); and the remains from the cloth treated with Product II 4 (i.e., polysiliconated phosphoramide (R=H));

As illustrated by FIG. 3, the fire-protecting capability of the siliconated phosphoramides greatly enhances the stability of the substrate against fire as well as resulting in a stable char, as opposed to what is obtained from the brominated compound.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:
1. A polysiloxane phosphoramide having the basic structural unit:

wherein,
Y is O or S;
R' is selected from a saturated or unsaturated alkyl, an aryl, a heterocyclic, and a cycloaliphatic;
R is selected from H, a saturated or unsaturated alkyl, an aryl, a heterocyclic, and a cycloaliphatic;
X is selected from H, a saturated or unsaturated alkyl, an aryl, a heterocyclic, and a cycloaliphatic;
n is selected from 0 to 500; and
χ is selected from 1-500.

2. The polysiloxane phosphoramide according to claim 1, wherein R includes a vinyl group.

3. The polysiloxane phosphoramide according to claim 1, wherein n is selected from 0 to 5.

4. The polysiloxane phosphoramide according to claim 3, wherein χ is selected from 1 to 5.

5. The polysiloxane phosphoramide according to claim 1, wherein n is selected from 200 to 500.

6. A composition, comprising a polysiloxane phosphoramide having the basic structural unit:

wherein,
Y is O or S;
R' is selected from a saturated or unsaturated alkyl, an aryl, a heterocyclic, and a cycloaliphatic;
R is selected from H, a saturated or unsaturated alkyl, an aryl, a heterocyclic, and a cycloaliphatic;
X is selected from H, a saturated or unsaturated alkyl, an aryl, a heterocyclic, and a cycloaliphatic;
n is selected from 0 to 500; and
χ is selected from 1-500.

7. The composition according to claim 6, further comprising a base polymer comprising a polyimide, an epoxy-based resin, a polybenzimidazole, a polyester, polyquinoxyline, polyacrylate, phenolic polymer, or a silicone.

8. The composition according to claim 6, further comprising a base polymer selected from a polyimide or epoxy-based resin.

9. The composition according to claim 7, wherein the polysiloxane phosphoramide is present from between 1% to 30% by weight in the base polymer.

10. The composition according to claim 6, wherein the resin is in the form of a neat sprayable material.

11. The composition according to claim 7, wherein the resin is dissolved in a solvent to form a sprayable material.

12. The composition according to claim 6, wherein R is selected from H or CH$_3$, and X is CH$_3$.

13. A fire resistant composite, comprising a cured polymer resin comprising a polysiloxane phosphoramide having the basic structural unit:

wherein,
Y is O or S;
R' is selected from a saturated or unsaturated alkyl, an aryl, a heterocyclic, and a cycloaliphatic;
R is selected from H, a saturated or unsaturated alkyl, an aryl, a heterocyclic, and a cycloaliphatic;
X is selected from H, a saturated or unsaturated alkyl, an aryl, a heterocyclic, and a cycloaliphatic;
n is selected from 0 to 500; and
χ is selected from 1-500.

14. The fire resistant composite according to claim 13, wherein the cured polymer resin comprises a cured mixture of a polysiloxane phosphoramide and a base polymer comprising a polyimide, an epoxy-based resin, a polybenzimidazole, a polyester, polyquinoxyline, polyacrylate, phenolic polymer, or a silicone.

15. The fire resistant composite according to claim 13, wherein the cured mixture comprises a polysiloxane phosphoramide and a polymer selected from a polyimide or epoxy-based resin.

16. A method of treating a surface to render the surface fire resistant comprising applying to the surface a liquid composition comprising at least one polysiloxane phosphoramide; wherein at least one polysiloxane phosphoramide comprises the basic structural unit:

wherein
Y is O or S;
R' is selected from a saturated or unsaturated alkyl, an aryl, a heterocyclic, and a cycloaliphatic;
R is selected from H, a saturated or unsaturated alkyl, an aryl, a heterocyclic, and a cycloaliphatic;
X is selected from H, a saturated or unsaturated alkyl, an aryl, a heterocyclic, and a cycloaliphatic;
n is selected from 0 to 500; and
χ is selected from 1-500.

17. The method according to claim 16, wherein liquid composition comprises a neat solution of said polysiloxane phosphoramide.

18. The method according to claim 16, wherein the liquid composition further comprises a base polymer comprising a polyimide, an epoxy-based resin, a polybenzimidazole, a polyester, polyquinoxyline, polyacrylate, phenolic polymer, or a silicone; and said polysiloxane phosphoramide is present from 1% to 30% by weight in the base polymer.

19. The method according to claim 16, wherein said applying step comprises spraying said composition onto said surface.

20. A fire resistant article comprising an inorganic or organic surface having a fire resistant layer bonded to said surface, said fire resistant layer comprising a polysiloxane phosphoramide comprising the basic structural unit:

wherein,
Y is O or S;
R' is selected from a saturated or unsaturated alkyl, an aryl, a heterocyclic, and a cycloaliphatic;
R is selected from H, a saturated or unsaturated alkyl, an aryl, a heterocyclic, and a cycloaliphatic;
X is selected from H, a saturated or unsaturated alkyl, an aryl, a heterocyclic, and a cycloaliphatic;
n is selected from 0 to 500; and
χ is selected from 1-500.

21. The fire resistant article according to claim 20; wherein said fire resistant layer and said surface are attached by bonds formed between the surface and any reactively compatible functional group incorporated into the polysiloxane phosphoramide.

22. The fire resistant article according to claim 21, wherein the reactively compatible functional group incorporated into the polysiloxane phosphoramide are selected from vinyl, allyl, and carboxyl groups.

23. A method for preparing a polysiloxane phosphoramide according to claim 1, comprising a step of reacting a P-substituted phosphonate ester with a diamino-substituted silane.

* * * * *